No. 768,529. PATENTED AUG. 23, 1904.
C. B. KING.
LUBRICATOR.
APPLICATION FILED JUNE 1, 1903.
NO MODEL.

WITNESSES
INVENTOR
CHARLES B. KING
BY
James Whittemore ATTY.

No. 768,529.

Patented August 23, 1904.

UNITED STATES PATENT OFFICE.

CHARLES B. KING, OF DETROIT, MICHIGAN.

LUBRICATOR.

SPECIFICATION forming part of Letters Patent No. 768,529, dated August 23, 1904.

Application filed June 1, 1903. Serial No. 159,704. (No model.)

*To all whom it may concern:*

Be it known that I, CHARLES B. KING, a citizen of the United States, residing at Detroit, in the county of Wayne and State of Michigan, have invented certain new and useful Improvements in Lubricators, of which the following is a specification, reference being had therein to the accompanying drawings.

The invention relates to lubricators of that type in which the lubricant for a plurality of different bearings is fed from a single cup or receptacle.

It is the object of the invention to provide means by which the amount of lubricant fed to each bearing is properly proportioned and, further, to obtain a simple construction.

Heretofore lubricant cups or receptacles have been provided with a plurality of conduits leading to various bearings to be lubricated. These bearings are, however, seldom a uniform distance from the cup, and as a consequence there will be greater frictional resistance to the passage of the lubricant in the longer conduits than in the shorter ones, particularly when semisolid lubricants are used. This will result in feeding a greater amount of the lubricant to one bearing than to another. In the present invention this objection is overcome by providing means for feeding the lubricant successively to the various conduits, and thus accurately proportioning the amount fed.

The invention consists in the means employed for this purpose and, further, in the peculiar construction, arrangement, and combination of parts, as hereinafter set forth.

Figure 5:
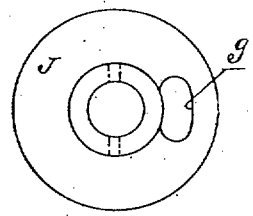
Figure 4:
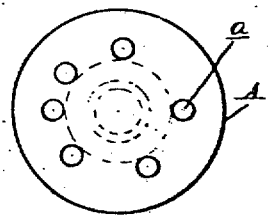
Figures 1, 6:
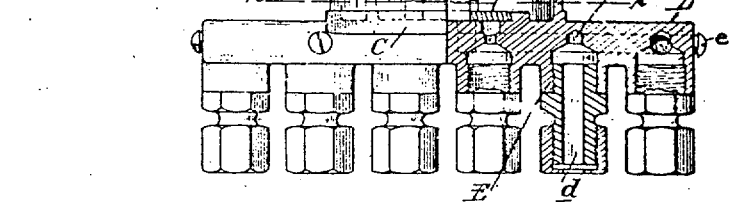
Figure 3:
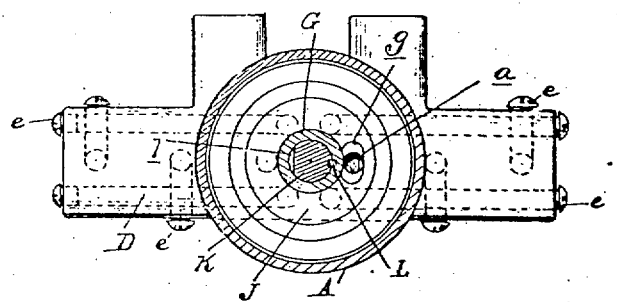
Figure 2:
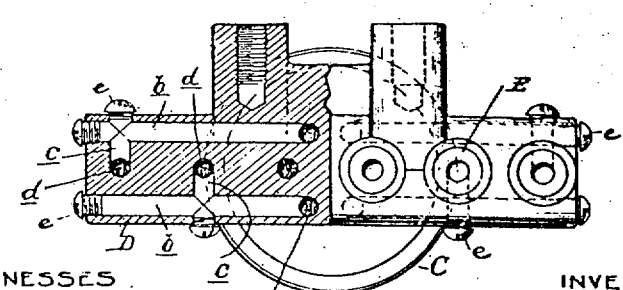

In the drawings, Figure 1 is a sectional elevation of the lubricator. Fig. 2 is a bottom plan view thereof, partly in section. Fig. 3 is a horizontal section on line X X, Fig. 1. Fig. 4 is a view of the seat for the cut-off disk, showing a modified construction involving a different arrangement of the ports $a$ below the cut-off and opening to the conduits leading to the various bearings. Figs. 5 and 6 are respectively a plan and side elevation of the cut-off.

A is a cup or receptacle for the lubricant, for which a plastic grease or heavy oil is preferably employed.

B represents a plurality of passages formed in the bottom of the cup A and leading, respectively, to a plurality of conduits for conveying the lubricant to the different bearings. As shown, the cup A has formed integral therewith a bottom portion C, having the elongated member D extending transversely thereof and beyond the sides of the cup. In this rib are formed the passages B, which respectively connect with nipples or couplings E for the conduits. The inner ends of the passages B or ports which open into the cup are arranged in a circular series in the bottom of the cup, as indicated in Figs. 2 and 3. These may be formed by boring the vertical passages $a$, two of which connect directly with their couplings E and the others being indirectly connected with their respective couplings by longitudinal bores $b$ and cross-bores $c$ in the rib D. These longitudinal and cross-bores are arranged to intersect each other and also with the vertical passages $d$, bored through the coupling-nipples E. The open ends of these bores may then be stopped by plugs $e$, thereby forming a continuous passage from the bore $a$ to the conduit.

For feeding the lubricant downward into the cup and into the different conduits a follower F is provided, which preferably has a screw-threaded engagement with the interior of the cup A.

G is a stem for rotating the follower F, which passes outward through a suitable cap H and is provided with an operating-handle I.

With the construction as thus far described when the cup is filled with lubricant and the handle I is rotated the follower F will be moved downward, so as to force the lubricant down through the various passages through the couplings E, and hence through the conduits (not shown) to the different bearings. The feeding of the lubricant would not, however, be uniform, but would be largely directed to the nearest bearing. To properly proportion the feeding of the lubricant, I provide a cut-off J, which is adapted to close all but one of the ports $a$ and when operated to open and close said ports in rotation. As shown, this cut-off is formed by a disk J, bearing against the bottom of the cup, so as to cover the circular series of ports *a*. This disk is cut away at *g* to form a port which may be successively registered with the ports *a* in the rotation of the disk. The port *g* is preferably of segmental form and of a length equal to or slightly less than the distance between centers of adjacent ports. The disk J is arranged to be rotated by the rotation of the follower F. To this end the stem G of said follower is made tubular, and the stem K is secured to the disk J, which stem telescopes with the stem G. The two stems are caused to rotate together by a feather engagement L, this also permitting of the downward movement of the stem G in relation to the stem A.

*h* is a port in the stem G, connecting with the upper end of the chamber within said stem, and *i* is a plug for normally closing said port.

*l* is an air-passage extending longitudinally of the stem G and formed by partially cutting away the stem K.

The lubricator being constructed as described, in operation the receptacle A is first filled with lubricant, after which the follower is engaged with the upper end of the cup to press upon the top of the lubricant. The cut-off J remains permanently in the cup, and the upper end of the stem K is engaged with the tubular stem G upon the insertion of the follower. To feed the lubricant from the cup, the handle I is given a partial rotation. This will cause the downward movement of the follower, creating a pressure upon the lubricant, and at the same time the port *g* will be successively registered with the ports *a* by the rotation of the disk J. As the port *g* passes each of the ports *a* a definite amount of lubricant will be forced through the registering ports and into the connecting-conduit. It will be understood that the quantity fed into each port is properly proportioned, for the reason that but one port is open, and the pressure of the follower upon the lubricant will cause the displacement of a definite amount. When the follower F is first inserted in the cup, the space within the tubular stem G will be filled with air. If the handle I were then operated to move downward the follower, the pressure created on the lubricant would cause the compression of the air in this chamber, with the result that the lubricant would not be immediately fed into the conduits. Thus an uneven feed might result, as the gradual expansion of the compressed air would cause an excessive feeding of lubricant through the conduits of least resistance. This difficulty is overcome by removing the plug *i* when the follower F is first inserted and in then turning the handle I until a portion of the lubricant is forced up between the stems K and G and displaces the air. The plug *i* may then be again inserted, after which the operation of the handle will cause the immediate feeding of the lubricant.

For some uses it is desirable to feed a larger amount of lubricant to one than to another of the bearings. This result may be attained, together with an exact proportioning of the lubricant to the different bearings, by providing a differential spacing of the ports *a* below the cut-off and controlled thereby. Thus where there is a large space between adjacent ports the follower will move a greater distance during the interval in which the cut-off is traveling from one port to the other, and as a consequence a larger amount of lubricant will be displaced.

What I claim as my invention is—

1. In a lubricator the combination with a cylindrical receptacle provided with a plurality of discharge-ports in one head thereof, of a follower for feeding the lubricant from said receptacle into said ports, a rotary disk within the receptacle covering the ported head and cut away to disclose one of the ports and a stem for said disk telescopically engaging said follower and adapted to be rotated thereby to successively open said ports.

2. In a lubricator, the combination of a cylindrical receptacle provided with a plurality of ports in one head thereof, a follower having a screw-threaded engagement with said cylinder, a hollow stem for rotating said follower, a disk covering the ported head within said receptacle, but partially cut away to disclose one of said ports, a stem for rotating said disk telescoping within said hollow stem and means for causing said stems to rotate together.

3. In a lubricator, the combination of a cylindrical receptacle for the lubricant having a plurality of ports in one head thereof, a follower for propelling the lubricant from said receptacle, a cut-off for successively opening said ports actuated by said follower and means for releasing the air entrapped in the receptacle below the follower by the engagement of said follower whereby the movement of the latter will positively propel the oil.

4. In a lubricator, the combination of a cylindrical receptacle provided with a plurality of ports in one head thereof, a follower within and having a screw-threaded engagement with said receptacle, a hollow stem for rotating said follower, a disk covering the ported head within said receptacle and partially cut away to disclose one port, a stem secured to said disk telescopically engaging said hollow stem and arranged to be turned thereby, and a detachable plug for closing the vent-opening in said hollow stem whereby the entrapped air may be released.

5. In a lubricator, the combination with a receptacle for the lubricant having a plurality of discharge-ports spaced at different intervals from each other, of a follower for forcing the lubricant in said receptacle therefrom and through said ports and a cut-off actuated by said follower adapted to successively open said ports.

6. In a lubricator, the combination with a receptacle for the lubricant having a plurality of conduits leading therefrom, of a cut-off for said conduits, and means for forcing the lubricant from the said receptacle to said conduits successively, the inlets to said conduits being at irregular distances apart.

7. In a lubricator the combination with a receptacle for the lubricant having a plurality of conduits connected therewith, of a follower, a cut-off adapted to close connection with a portion of said conduits, and a single actuating device for rotating said follower to advance the same in the receptacle and for rotating the cut-off.

In testimony whereof I affix my signature in presence of two witnesses.

CHARLES B. KING.

Witnesses:
JAS. P. BARRY,
H. C. SMITH.